Figure 5:
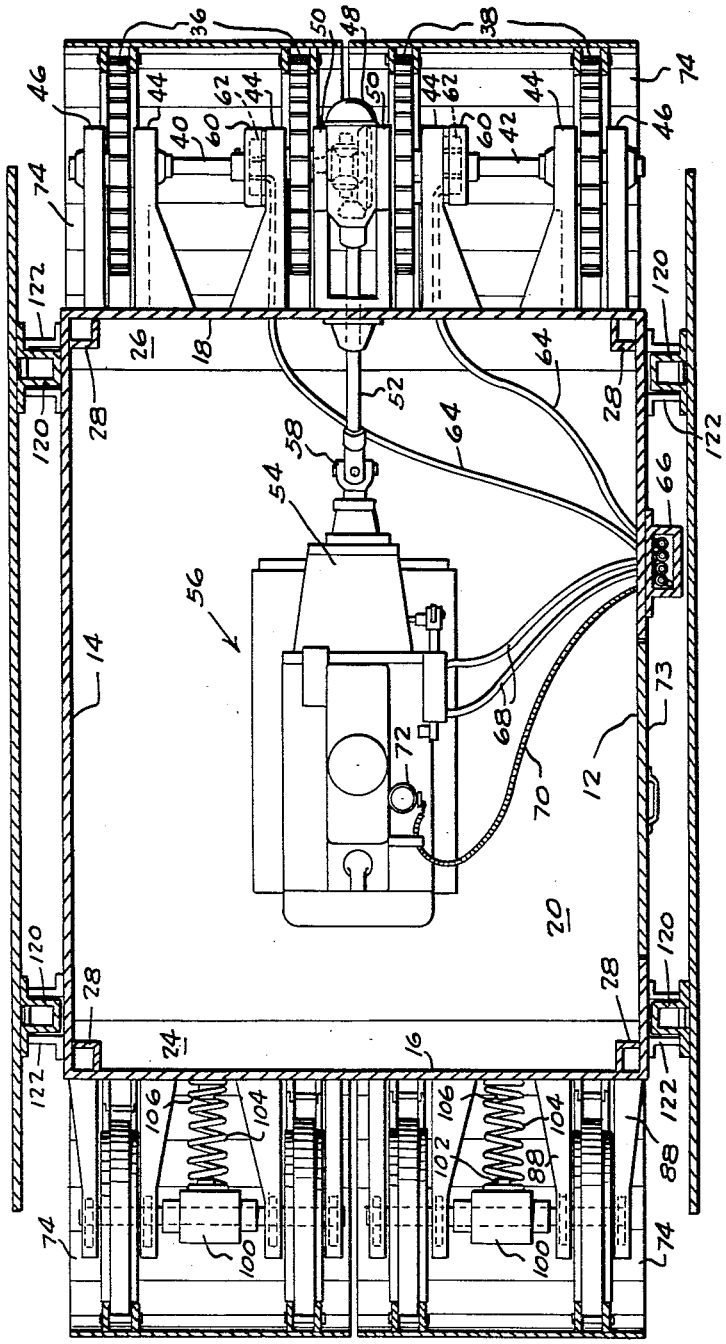

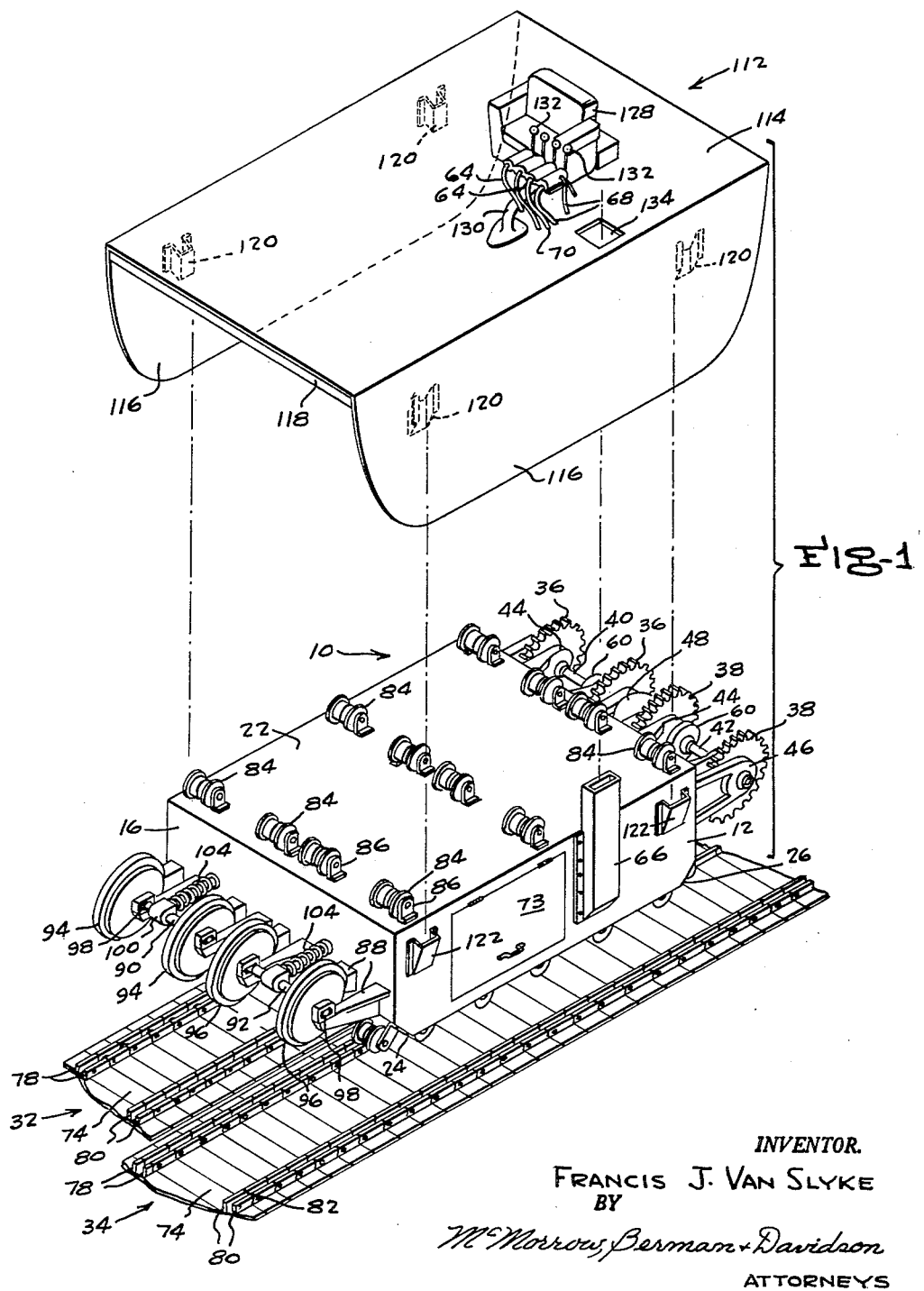

May 5, 1964 F. J. VAN SLYKE 3,131,781
TRACK-LAYING VEHICLE
Filed Dec. 8, 1961 4 Sheets-Sheet 2
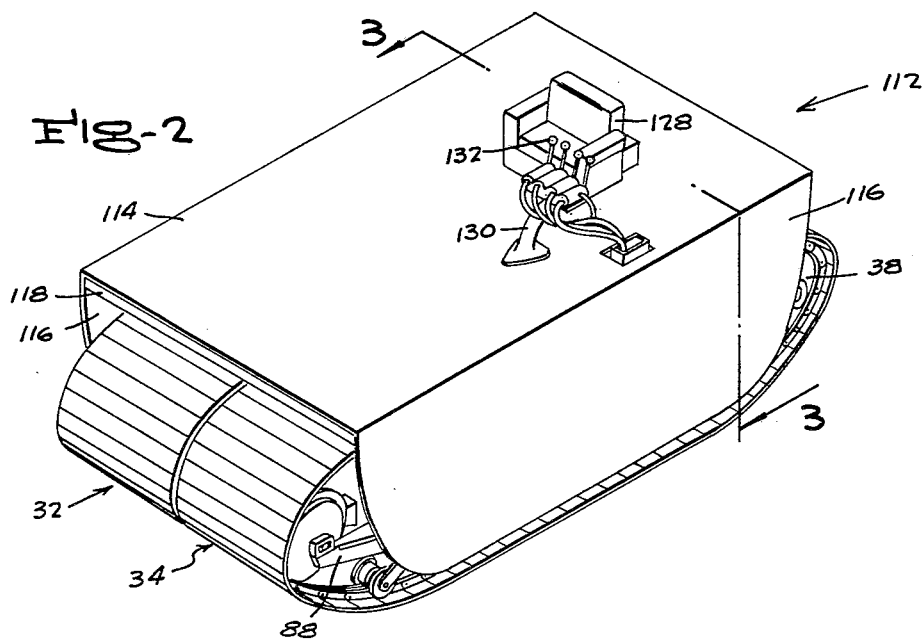
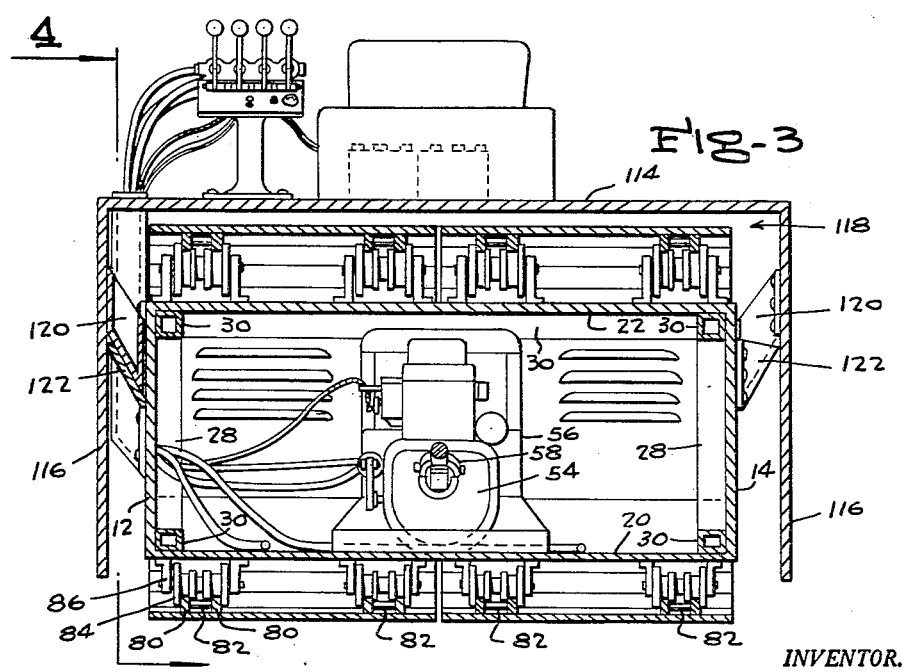
INVENTOR.
FRANCIS J. VAN SLYKE
BY
McMorrow, Berman & Davidson
ATTORNEYS

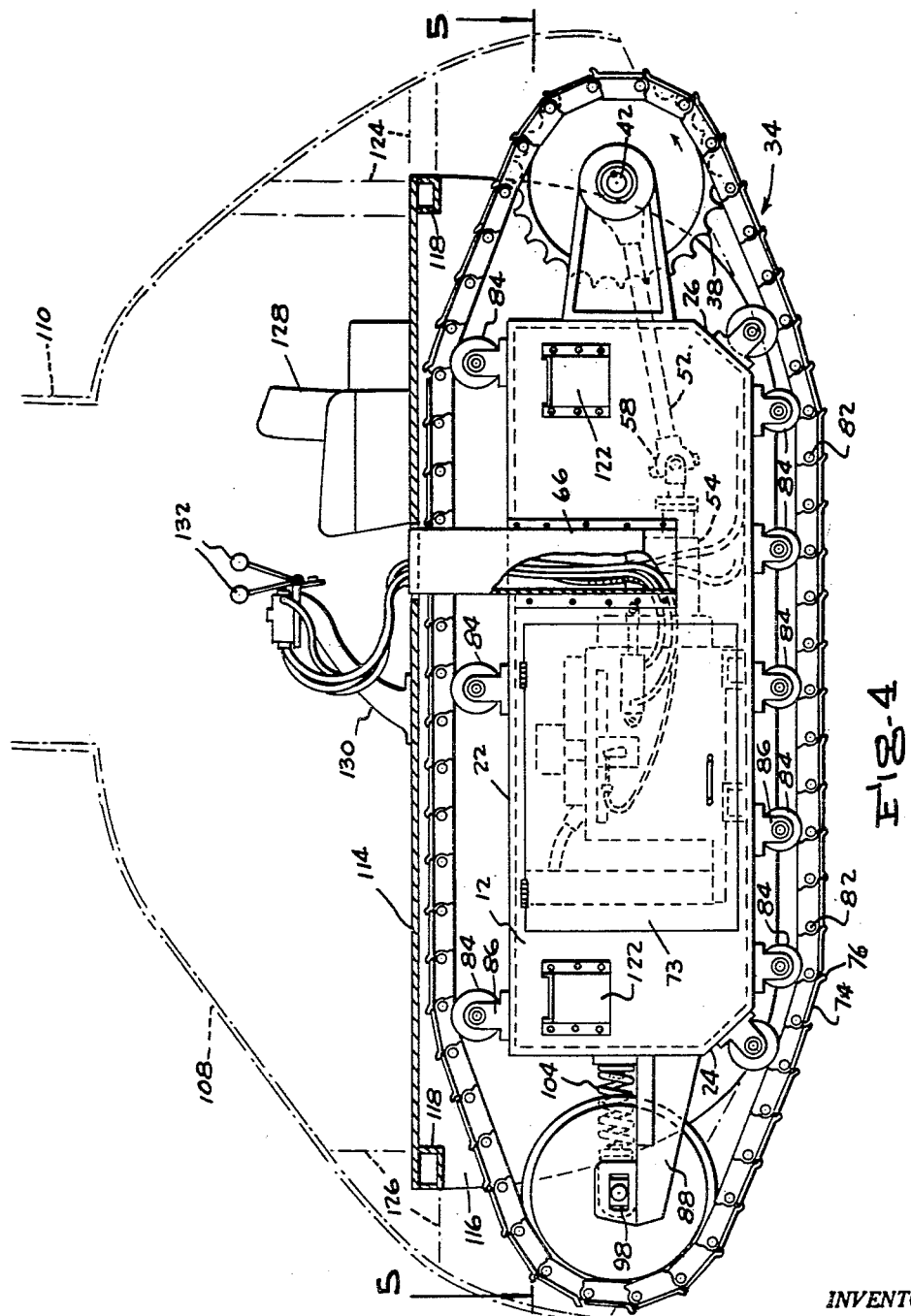

May 5, 1964  F. J. VAN SLYKE  3,131,781
TRACK-LAYING VEHICLE
Filed Dec. 8, 1961  4 Sheets-Sheet 4

INVENTOR.
FRANCIS J. VAN SLYKE
BY
McMorrow, Berman & Davidson
ATTORNEYS 3,131,781
TRACK-LAYING VEHICLE
Francis J. Van Slyke, Waterville, N.Y.
Filed Dec. 8, 1961, Ser. No. 157,937
2 Claims. (Cl. 180—6.7)

This invention relates to track-laying military vehicles of the types known as "tanks." Severe conditions of use impose unusual demands on the design and structure of these vehicles, among which is a requirement for a low center of gravity to avoid overturning when negotiating highly irregular and steeply sloped terrain.

It is therefore an object of the invention to provide a tank having a low center of gravity.

A further problem in tank construction involves the exposure of the endless tracks of the vehicle to hostile fire, and it is therefore also an object to provide a construction in which the tracks have optimum shielding. A still further, and related object, is to provide tank tracks having a surface area substantially greater than those heretofore known, and, in particular, to provide tracks having a total width comparable to the tank width.

Another object is to provide a vehicle of the track-laying type which embodies a powerful traction feature capable of operating with a high degree of efficiency in various fields other than for purely military purposes.

These and other ends, which will be readily apparent, are attained by the present invention, a preferred form of which is described in the following specification, as illustrated in the drawings, in which:

FIGURE 1 is an exploded view, in perspective, showing the floor unit of the cab, the engine compartment, with track guides, and fragments of the two tracks, FIGURE 2 is a view similar to FIGURE 1, with the parts thereof assembled, FIGURE 3 is a sectional view taken on the vertical plane of the line 3—3 of FIGURE 2, FIGURE 4 is a sectional view taken on the vertical plane of the line 4—4 of FIGURE 3, and FIGURE 5 is a sectional view taken on the horizontal plane of the line 5—5 of FIGURE 4.

Referring to the drawings by characters of reference, there is shown a generally rectangular, and relatively shallow, steel box 10 (FIG. 1), which constitutes a housing for the tank engine and transmission, and a mount for the externally located track guides, drive, and differential. Thus, the box 10 has two vertical side walls 12, 14, two vertical end walls 16, 18, a bottom or floor 20, and a top plate 22. The side and end walls are shaped to provide oblique panels 24, 26, at the lower, end corners of the box, conforming to the track guide system, as will be seen. The box 10 is strengthened by angle irons 28 in the interior, vertical corners, and square tubes 30 in the interior, horizontal corners.

As will be seen, the two tracks 32, 34, encircle the box 10, and the latter is provided with the drive means and the guides for the tracks. The drive is provided by two pairs, 36, 38, of co-axially mounted sprockets, keyed, respectively, to two shaft sections 40, 42, journalled in brackets 44, 46 carried by end wall 18, and connected through a differential 48, carried in a bracket 50 on the end wall. A propeller shaft 52 leads through an opening in the end wall 18 to a transmission unit 54 of an engine 56, being connected by a universal coupling 58. Brake drums 60 are mounted on the sprocket shafts, and the brake shoes 62, carried by the innermost brackets 44, are operated through flexible control lines 64, which lead outwardly through an opening in the box, and upwardly to the driver's compartment through a rectangular tube 66 secured to side wall 12 of the box. Through proper manipulation of these controls, normal braking of the vehicle may be effected, or steering by braking may be accomplished. The control conduit 66 also accommodates a pair of control lines 68, leading to the transmission, and a throttle control 70 leading to the carburetor 72. A hinged door 73 in the wall 12, provides access to the engine.

The tracks 32, 34, each comprise a series of laterally elongate shoes 74, with turned edges 76 to provide ground-gripping lugs, and near the ends of each shoe, pairs of lugs 78, 80, carry the pivot pins 82, which unite the track and give it proper flexibility. As far as the present invention is concerned, the important features of the track are its width, and the provision of two widely separated lines of pins, and therefore the pivot construction has been shown only generally.

It will be noted in FIGURES 1, 2 and 5, that the two side-by-side tracks take up the entire width of the engine compartment, and are looped around this box. For guiding the tracks the top 10, bottom 20, and panel 24 of the box are provided with a series of idler rollers 84, journalled in brackets 86, the rollers being of spool shape to engage the outside faces of the lug pairs 78, 80 (FIG. 3). Similarly, the front end 16 of the box carries a series of brackets 88, mounting a pair of shafts 90, 92, carrying pairs of large idler rollers 94, 96, the peripheries of which are adapted to be received between the lug pairs 78, 80 (FIG. 5).

For proper tensioning of the track, the front idlers 94, 96 are resiliently mounted, for sliding movement of their shafts in a horizontal plane. To this end, each shaft is mounted in an elongate opening 98 in the brackets 88, and each carries a lug 100 (FIG. 5), with an extending shank 102, the latter being received in one end of a compression coil spring 104, the other end of which is anchored on a shank 106 carried by wall 16 of box 10. Besides providing for tensioning, to take up all slack in the track, the resilient mounting protects the track against breakage due to the shock of sudden, severe loads.

The top closure 108 for the tank is shown in broken lines in FIGURE 4. This hood element, or cab, with a turret 110 for mounting guns, may partake of various shapes and sizes, and is therefore not shown in detail. It should, however, envelop the tracks to the maximum possible. For purposes of illustrating the present invention, only the floor or deck unit 112 of the shroud or hood 108 is shown in solid lines, and this suffices to show the structural relation between the engine box, the track and the cab. This unit has a flat deck or floor, 114, with depending side skirts 116, and is reinforced on its underside, at its ends, by channel beams 118. The deck unit is mounted on the box 10 by means of a series of four cleats 120, carried on the inner faces of skirts 116, and receivable in sockets 122 carried on walls 12 and 14 of the engine box. Conveniently, the sockets 122 will be wedge-form, as shown, and the cleats 120 will have a complementary shape, so that fitting of the parts may be easily effected, and secure lodgment obtained. Obviously, the connecting means may be provided with suitable fastening means.

The connection between the hood 108 and the deck 112 is indicated only generally by the dotted lines 124, 126, in FIGURE 4, since the particular arrangement chosen is not critical. Thus, the parts may be permanently secured together, as by bolts or welding, or they may be arranged for ready detachment. However, any arrangement selected should provide for sealing off the driver's compartment against gases from the engine, and dust and other foreign matter from without. No ventilation has been shown for the engine compartment, but it will be understood that this is contemplated in some form, as by forced draft, through the bottom or sides of the vehicle, or both.

A driver's seat 128 is shown mounted on the floor 114 of the cab, and convenient thereto is a goose-neck bracket 130 secured to the floor, and carrying control knobs 132, operatively associated with the upper ends of the respective control lines 64, 68 and 70, shown in FIGURE 5, an opening 134 (FIGURE 1) being provided in the floor to accommodate the tube guide 66 for the control lines.

It will be seen that by providing a track which is looped around the engine compartment, it is possible to use very wide tracks, comparable to the width of the vehicle, and thus provide highly improved traction. At the same time the mounting of the tracks on their guides is rendered much more secure than has been the case heretofore, and most of the track is in a protected position. An other advantage is that various forms of superstructure may be mounted, alternatively, on the engine and track unit by the simple expedient of lifting one off and replacing it with another. Thus, a tank may be converted to a troop carrier, or other forms of military vehicle body which now carry their own tracks. In the case of use as a tank, another advantage appears in the ventilating space between the cab and the engine compartment, which considerably lowers the temperatures to which the occupants are subjected.

Generally speaking, whereas a preferred modification has been shown and described, various other forms will be apparent, in the light of this disclosure, and the invention should not, therefore, be deemed as limited, except insofar as shall appear from the spirit and scope of the appended claims.

I claim:

1. A track-laying vehicle of the armored type, comprising a container housing an engine and transmission, a pair of endless tracks looped around said container and extending over substantially the entire width of said container, said tracks comprising articulated shoes each having a mounting means near each end for a hinge pin, and defining a guide rail, idler rollers carried by the top, bottom and one end of said container and adapted to mate with said guide rails, two pairs of sprockets carried on the other end of said container and adapted to engage the hinge pins of the track, a differential gear unit connecting the two pairs of sprockets, brake means associated with each of the said two pairs of sprockets, a drive shaft between said transmission and said differential unit, a cab superstructure adapted for positioning above said tracks, comprising a floor with depending side skirts, a plurality of cleats carried on the inner faces of said skirts, a series of sockets carried by said container and adapted to receive said cleats, a conduit carried by said container, and communicating with the interior of said container and the upper side of said floor, a control unit carried by said floor, and control lines leading to said engine, transmission and brakes through said conduit.

2. A track-laying vehicle of the armored type, comprising a container housing an engine and transmission, a pair of endless tracks looped around said container and extending over substantially the entire width of said container, said tracks comprising articulated shoes each having a mounting means near each end for a hinge pin, and defining a guide rail, idler rollers carried by the top, bottom and one end of said container and adapted to mate with said guide rails, two pairs of sprockets carried on the other end of said container and adapted to engage the hinge pins of the track, a differential gear unit connecting the two pairs of sprockets, brake means associated with each of the said two pairs of sprockets, a drive shaft between said transmission and said differential unit, a cab superstructure adapted for positioning above said tracks, comprising a floor with depending side skirts, means to secure said skirts to said container, a conduit carried by said container, and communicating with the interior of said container, through a side thereof, and through the upper side of said floor, a control unit carried by said floor, and control lines leading to said engine, transmission and brakes through said conduit.

References Cited in the file of this patent
UNITED STATES PATENTS

| | | |
|---|---|---|
| 895,278 | Lettinger | Aug. 4, 1908 |
| 1,781,978 | Davis | Nov. 18, 1930 |
| 1,987,265 | Miller | Jan. 8, 1935 |
| 2,171,846 | Davidson | Sept. 5, 1939 |
| 2,321,874 | Tandler et al. | June 15, 1943 |
| 2,373,316 | Landy | Apr. 10, 1945 |
| 2,389,624 | Knox et al. | Nov. 27, 1945 |